United States Patent [19]

Akatsu et al.

[11] Patent Number: 5,016,907
[45] Date of Patent: May 21, 1991

[54] ANTI-ROLLING CONTROL SYSTEM FOR AUTOMOTIVE ACTIVE SUSPENSION SYSTEM

[75] Inventors: Yohsuke Akatsu; Naoto Fukushima; Itaru Fujimura; Yukio Fukunaga, all of Kanagawa, Japan

[73] Assignee: Nissan Motor Company, Limited, Yokohama, Japan

[21] Appl. No.: 387,271

[22] Filed: Jul. 31, 1989

[30] Foreign Application Priority Data

Jul. 29, 1988 [JP] Japan ................................ 63-190327

[51] Int. Cl.⁵ ............................................. B60G 17/08
[52] U.S. Cl. .................................... 280/707; 280/840; 280/DIG. 1; 267/64.16; 188/299
[58] Field of Search ................. 280/703, 707, DIG. 1; 267/64.16; 188/299

[56] References Cited

U.S. PATENT DOCUMENTS

| | | | |
|---|---|---|---|
| 4,373,744 | 2/1983 | Glaze | 280/707 |
| 4,621,833 | 11/1986 | Soltis | 280/707 |
| 4,702,490 | 10/1987 | Yamaguchi et al. | 280/707 |
| 4,712,807 | 12/1987 | Kurosawa | 280/707 |
| 4,761,022 | 8/1988 | Ohashi et al. | 280/703 |

FOREIGN PATENT DOCUMENTS 0193124 9/1986 European Pat. Off. .

Primary Examiner—Richard A. Bertsch
Attorney, Agent, or Firm—Foley & Lardner

[57] ABSTRACT

An active suspension control system employs a strategy minimum fluid pressure in the working chamber of an inside suspension system is reached at greater lateral acceleration than that via which at which the maximum fluid pressure in the working chamber of an outside suspension system is reached. The system also takes a strategy for adjusting the fluid pressure in the working chambers of the inside and outside suspension system inversely proportional to each other while the lateral acceleration is maintained smaller than a predetermined pressure at which the maximum fluid pressure in the working chamber of the outside suspension system is reached. This assures driving stability and riding comfort by permitting vehicular rolling in response to a lateral acceleration greater that a given lateral acceleration criterion.

14 Claims, 9 Drawing Sheets

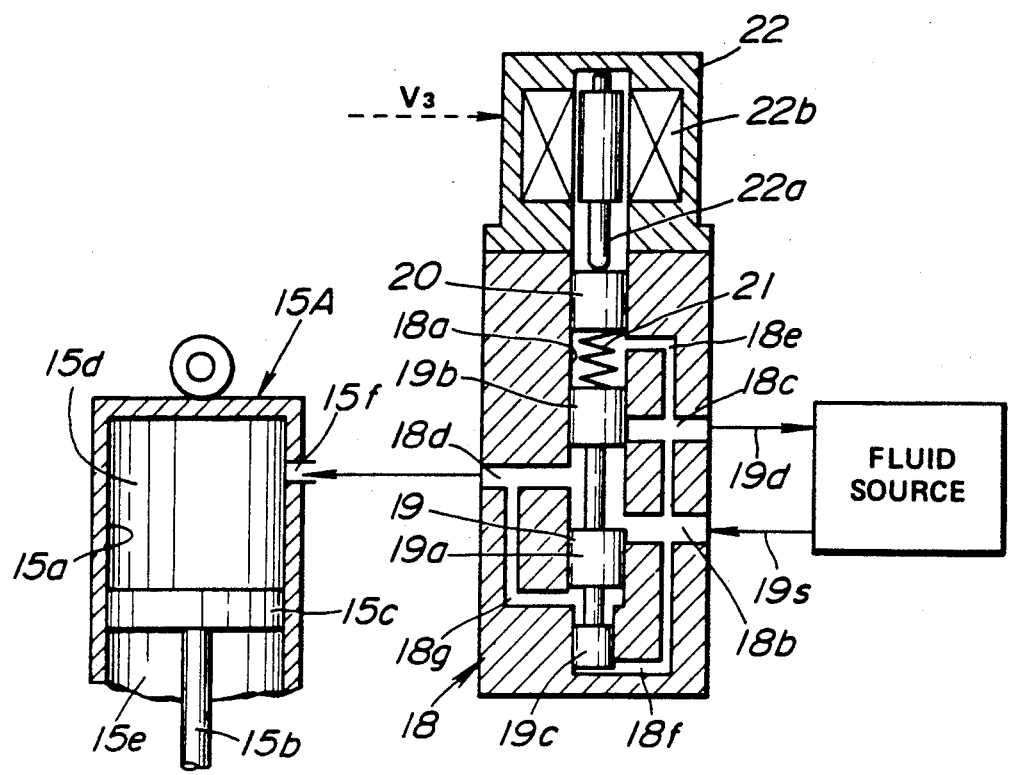
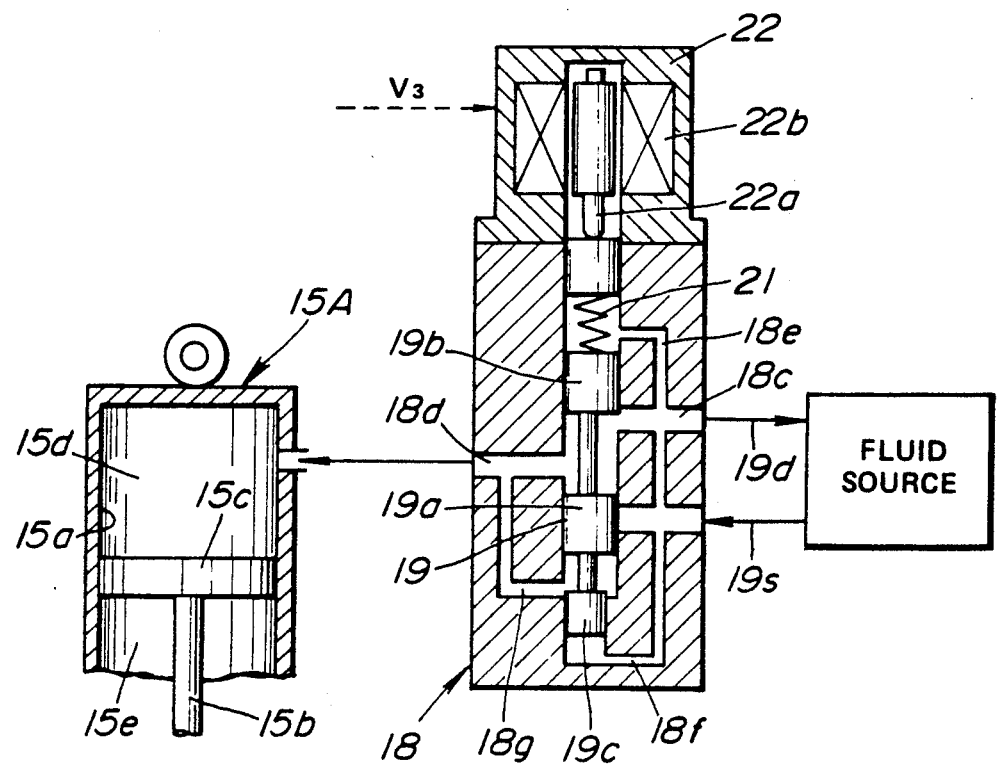

ANTI-ROLLING CONTROL SYSTEM FOR AUTOMOTIVE ACTIVE SUSPENSION SYSTEM

BACKGROUND OF THE INVENTION

1. Field of the Invention

The present invention relates generally to an actively controlled suspension system for an automotive vehicle. More specifically, the invention relates to an anti-rolling suspension control system which can maintain satisfactorily high driving stability and prevent the vehicles gravity center from being lifted up even during cornering to cause substantially great lateral acceleration.

2. Description of the Background Art

The U.S. Pat. No. 4,702,490, issued on Oct. 27, 1987, to Hirotsugu YAMAGUCHI et al., and assigned to the common assignee to the present invention, discloses an actively or positively controlled automotive suspension system which includes hydraulic cylinders for generating variable damping force against relative motion of a vehicular suspension member and a vehicle body in bounding and rebounding directions for adjusting suspension characteristics and adjusting vehicle body attitude.

A similar type of actively controlled suspension systems has been disclosed in the co-pending U.S. patent application Ser. No. 060,911, filed on June 12, 1987 and assigned to the common assignee to the present invention now U.S. Pat. No. 4,801,155. Further, European Patent First Publications Nos. 02 49 246 and 02 49 209 respectively corresponding to co-pending U.S. patent applications Ser. Nos. 061,368 (filed on June 15, 1987) and 059,888, filed on June 9, 1987, both of which have been assigned to the common assignee to the present invention. The later-mentioned three inventions include features of anti-rolling and/or anti-pitching suspension control for adjusting damping characteristics at respective vehicular wheels for suppressing vehicular rolling motion.

In such prior proposed active suspension control systems damping characteristics of the suspension oriented outside of the corner, which suspension system will be hereafter simply referred to as "outside suspension systems", are harder in order to prevent outward shifting of a vehicular body gravity center due to centrifugal forces exerted on the vehicular body, and, on the other hand, damping characteristics of the suspension systems oriented inside of the corner, which will be hereafter simply referred to as "inside suspension systems" are softened for preventing damping characteristics from serving as a source of self-induced rolling motion. In the practical suspension control, suspension control the signal for the outside suspension system is increased according to an increasing of the lateral acceleration exerted on the vehicular body, which suspension control signal will be hereafter referred to as "outside suspension control signal", and, on the other hand, the suspension control system for the inside suspension system, which is produced by inverting the outside suspension control signal, is decreased inversely proportional to the increasing rate of the outside suspension control signal, which suspension control system for the inside suspension system will be hereafter referred to as "inside suspension control signal." By such strategy of suspension control, minimum fluid pressure to be generated in a working chamber of the inside suspension system is set to be reached at a predetermined lateral acceleration. On the other hand, the fluid pressure in the working chamber of the outside suspension system does not reach a predetermined maximum pressure at the predetermined lateral acceleration. Therefore, when the lateral acceleration exerted on the vehicular body becomes greater than the predetermined lateral acceleration, the fluid pressure of the working chamber in the inside suspension system is maintained at a minimum pressure and only the fluid pressure of the working chamber of the outside suspension system is increased toward a predetermined maximum pressure. When the lateral acceleration becomes substantial, increased fluid pressure in the outside suspension system becomes a source of vehicular attitude change to cause lifting of the outside of the vehicular body leading lifting up of the gravity center. This gives a feeling for the passenger in the vehicle that the vehicle is shifting upward toward the outside, to cause degradation of the riding comfort.

SUMMARY OF THE INVENTION

Therefore, it is an object of the present invention to provide an active suspension control system which can assure driving stability even at substantial lateral acceleration.

Another object of the invention is to provide an active suspension control system which can successfully prevent the gravity center of the vehicle from lifting up during tight cornering which induces substantial lateral acceleration.

In order to accomplish the aforementioned and other objects, an active suspension control system, according to the present invention, employs a strategy that minimum fluid pressure in the working chamber of an inside suspension system is reached at greater lateral acceleration than that, at which the maximum fluid pressure in the working chamber of an outside suspension system is reached. The system also takes a strategy for adjusting the fluid pressure in the working chambers of the inside and outside suspension system inversely proportional to each other while the lateral acceleration is maintained smaller than a predetermined pressure, at which the maximum fluid pressure in the working chamber of the outside suspension system is reached. This assures driving stability and riding comfort by permitting vehicular rolling in response to a lateral acceleration greater that a given lateral acceleration criterion.

According to one aspect of the invention, an anti-rolling control system for an active suspension system for an automotive vehicle comprises:

a first suspension system disposed between one lateral side of a vehicular body and a suspension member rotatingly supporting a first rod wheel, the first suspension system including a first hydraulic means variable of a hydraulic damping characteristics between a first characteristics at which the damping force to be generated is maximum and a second characteristics at which the damping force to be generated is minimum across a predetermined neutral characteristics;

a second suspension system disposed between the other lateral side of a vehicular body and a suspension member rotatingly supporting a second rod wheel, the second suspension system including a second hydraulic means variable of a hydraulic damping characteristics between the first characteristics and the second characteristics across the predetermined neutral characteristics;

a first pressure control means connected to the first hydraulic means, for controlling fluid pressure in the first hydraulic means for varying damping characteristics between the first and second characteristics;

a second pressure control means connected to the second hydraulic means, for controlling fluid pressure in the second hydraulic means for varying damping characteristics between the first and second characteristics;

a first sensor means for monitoring lateral acceleration exerted on the vehicular body and producing a lateral acceleration indicative signal indicative of magnitude of monitored lateral acceleration and direction thereof; and a control means for deriving first and second lateral acceleration dependent control signals on the basis of the lateral acceleration indicative signal for varying damping characteristics of one of the first and second suspension systems toward the first characteristics and for varying damping characteristics of the other of the first and second suspension systems toward the second characteristics for suppressing vehicular rolling, the controlling means being set a control characteristics so that the damping characteristics of the one of the first and second suspension systems reaches the first characteristics at a first predetermined magnitude of lateral acceleration and the damping characteristics of the the other of the first and second suspension system reaches the second characteristics at a second predetermined magnitude of lateral acceleration, which second predetermined magnitude being greater than or equal to the first predetermined magnitude.

According to another aspect of the invention, an anti-rolling control system for an active suspension system for an automotive vehicle comprises:

a suspension system for supporting a vehicular body on a first wheel at a first lateral side and on a second wheel at a second lateral side opposite to the first lateral side, the suspension system including first and second cylinders filled with a working fluid and being variable of first and second fluid pressures therein for varying suspension characteristics, the first and second fluid pressures in the first and second cylinders being variable between a predetermined first maximum pressure and a predetermined second minimum pressure across a predetermined neutral pressure between the first and second pressures;

a first pressure control means associated with first cylinder, for adjusting the first fluid pressure in the first cylinder;

a second pressure control means associated with second cylinder, for adjusting the second fluid pressure in the second cylinder;

a first sensor means for monitoring lateral acceleration exerted on the vehicular body and producing a lateral acceleration indicative signal indicative of magnitude of monitored lateral acceleration and direction thereof; and a control means for deriving first and second lateral acceleration dependent control signals on the basis of the lateral acceleration indicative signal for varying fluid pressure of one of the first and second suspension systems toward the first fluid pressure and for varying fluid pressure of the other of the first and second suspension systems toward the fluid pressure for suppressing vehicular rolling, the controlling means being set a control characteristics so that the fluid pressure of the one of the first and second suspension systems reaches the first fluid pressure at a first predetermined magnitude of lateral acceleration and the fluid pressure of the other of the first and second suspension system reaches the fluid pressure at a second predetermined magnitude of lateral acceleration, which second predetermined magnitude being greater than or equal to the first predetermined magnitude.

Each of the first and second suspension systems may vary fluid pressure between the first and fluid pressures according to the magnitude of direction of the lateral acceleration at a constant rate. The first and second pressure control means may be responsive to the first and second lateral acceleration dependent control signals for varying fluid pressure at a same variation gradient.

The control means may provide an offset of the neutral characteristics toward the first fluid pressure at a predetermined magnitude from a center characteristics between the first and second fluid pressures. The active suspension control system may further comprise a second sensor for monitoring vertical acceleration at the first suspension system for producing a first vertical acceleration indicative signal, and a third sensor for monitoring vertical acceleration at the second suspension system for producing a second vertical acceleration indicative signal, and the control means is responsive to the first and second vertical acceleration indicative signals for producing first and second vertical acceleration dependent control signals for controlling the first and second pressure control means for performing bouncing control independently of each other. The control means may include means for combining the first lateral acceleration dependent control signal and the first vertical acceleration dependent control signal for producing a first and second control command for controlling operation of the first and second pressure control means. The first and second hydraulic means may respectively include means for absorbing high frequency and small magnitude road shock.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings:

FIGS. 3(a) and 3(b) are sectional views similar to FIG. 2, but showing the condition where a piston in the pressure control valve assembly is shifted downwardly for reducing fluid pressure in a fluid chamber of a hydraulic cylinder in the suspension system and upwardly to increase the fluid pressure in the fluid chamber;

DESCRIPTION OF THE PREFERRED EMBODIMENT

Figure 1:
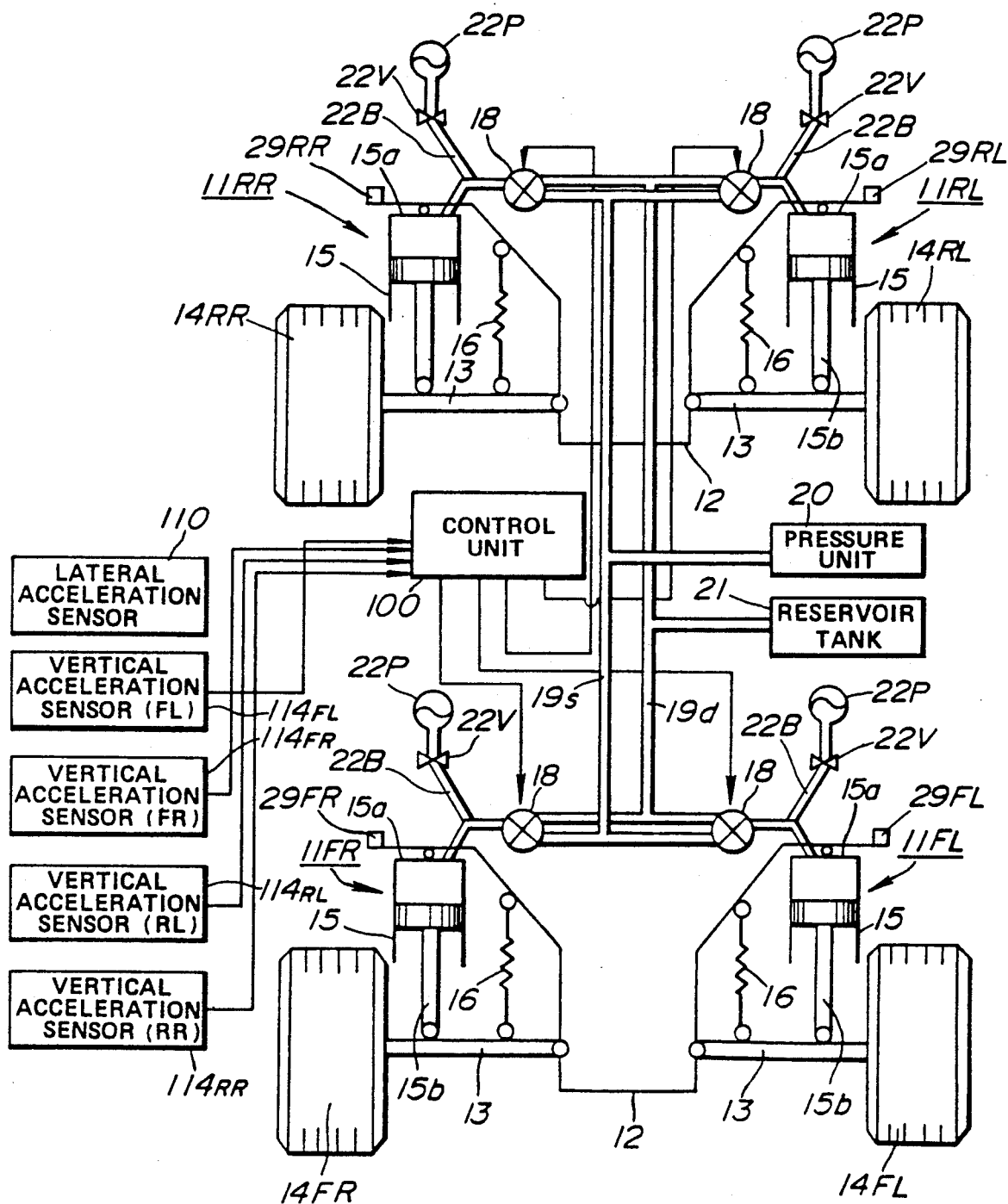
FIG. 1 is a schematic illustration of general construction of an actively controlled suspension system.

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator for generating damping forces against bounding and rebounding motion between the vehicle body and the suspension member, and a coil spring 16.

It should be appreciated that, in the shown embodiment, the coil spring 16 is not necessary to damp dynamic kinematic energy and should resiliently support only static loads to be exerted between the vehicle body and the suspension member. However, it should be, of course, possible to employ the coil spring which can be strong enough to damp part of dynamic kinematic energy in relative bounding and rebounding motion of the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one of the vehicle body 12 and the suspension member 13. On the other hand, the end of the piston rod 15b is connected to the other of the vehicle body 12 and the suspension member 13.

The hydraulic cylinder 15A of the suspension assembly 15 is connected to a hydraulic pressure source unit 20 via a hydraulic circuit which includes pressure control valve 18. The pressure control valve 18 is electrically operable and connected to a microprocessor-based control unit 100. The hydraulic circuit 19 includes a supply line 19a and a drain line 19d. The pressure source unit generally comprises a pressure unit 20 and a reservoir tank 21. The pressure unit 20 is connected to the reservoir tank 21 to suck the viscous working fluid in the reservoir tank 21 to feed to the pressure control valve 18 via the supply line 19a. On the other hand, the drain line 19d is connected to the reservoir 21 to return the working fluid thereto.

As seen from FIG. 1, a pressure accumulators 22P are communicated with the upper fluid chamber 15d of the hydraulic cylinder 15A via a pressure line 22B. A throttle valve 22V is inserted between the upper fluid chamber 15d and the pressure accumulator 22P. In the shown embodiment, the throttle valve 22V has a fixed throttling rate.

Figure 2:
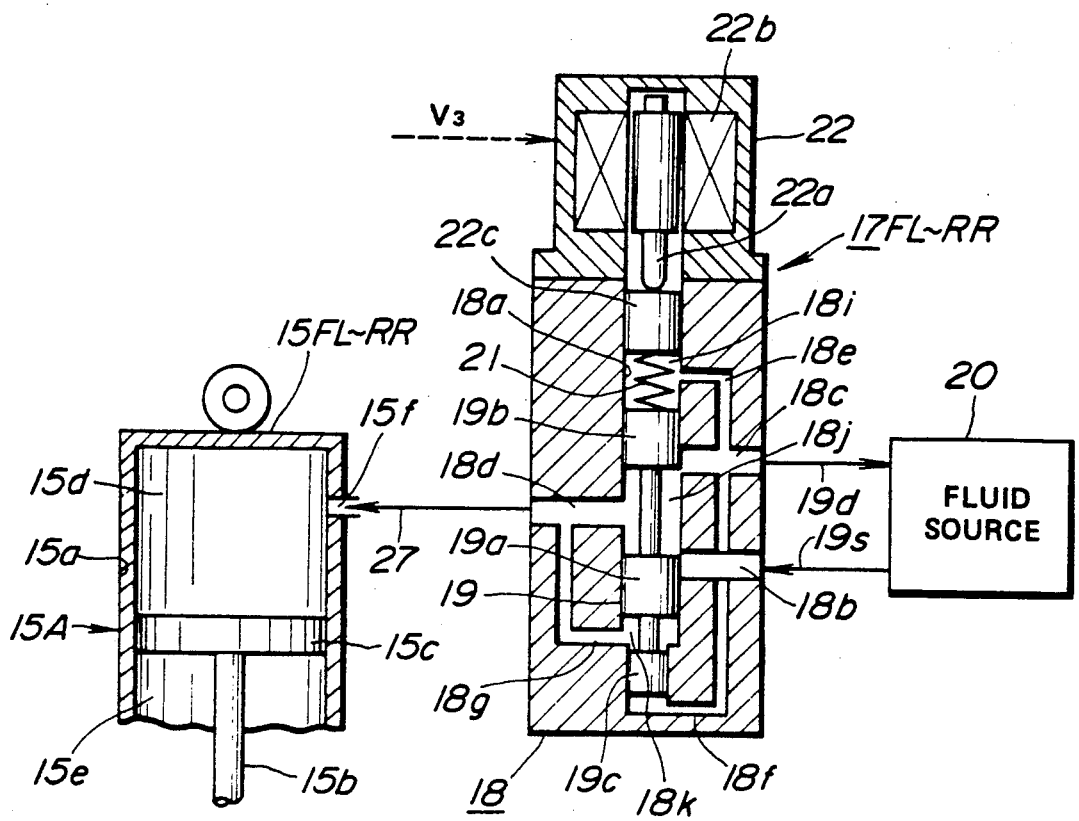
FIG. 2 is a sectional view of a pressure control valve assembly to be employed in the preferred embodiment of the actively controlled suspension system according to the invention.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. Though FIG. 2 does not show clear construction, the lower fluid chamber 15e is defined as an enclosed space and is filled with the viscous working fluid. The pressure of the working fluid in the lower fluid chamber 15e at an initial position of the piston 15c serves as a reference pressure and per se serves as resistance for downward movement of the piston.

The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. On the other hand, an pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The actuator piston 22c contacts with an actuator rod 22a of an electrically operable actuator 22 which comprises an electromagnetic solenoid. The solenoid 22 comprises a proportioning solenoid.

In order to increase the supply pressure of the working fluid, the spool valve 19 is shifted to the position shown in FIG. 3(A) to increase the path area at a throttle constituted at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be specified to the construction as illustrated in FIGS. 2, 3(A) and 3(B) but can be replaced with any appropriate constructions. For example, the pressure control valve constructions as illustrated in European Patent First Publication No. 01 93 124, set forth above, can also be employed. The disclosure of the aforementioned European Patent First Publication No. 01 93 124 is herein incorporated by reference for the sake of disclosure.

Figure 4:
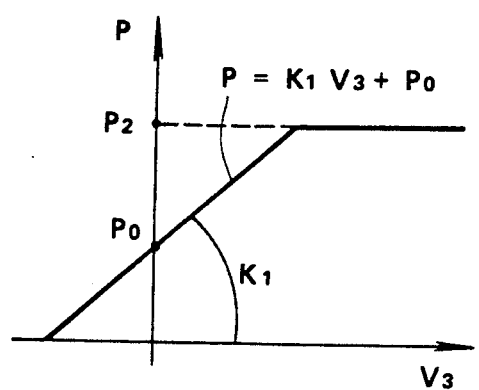
FIG. 4 is a graph showing the variation of the fluid pressure in a hydraulic cylinder as controlled by the pressure control valve assembly of FIG. 2.

As seen from FIG. 2, the proportioning solenoid 22 comprises the actuator rod 22a and a solenoid coil 22b. The solenoid coil 22b is energized by suspension control signals from the controller 100. In the shown embodiment of the pressure control valve, the working fluid pressure P at the outlet port 18d is variable according to the characteristics shown in FIG. 4.

The actuator rod 22a of the proportioning solenoid 22 is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic forces from the pressure control chamber 18k. Therefore, the valve spool 19 is oriented at the position in the valve bore at the position where the downward bias of the bias spring 22d balances with the upward hydraulic force of the pressure control chamber 18k.

When bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 22d and the upward hydraulic force of the pressure control chamber 18k. This causes upward movement of the valve spool 19 against the spring force of the bias spring 22d, as shown in FIG. 3(B). As a result, the path area of the drain port 18c increases and the inlet port 18b is blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body.

When rebounding motion occurs at the suspension member, the piston 15c of the hydraulic cylinder 15A shifts downwardly to decrease the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result the path area of the inlet port 18b increases and the drain port 18c is blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Here, since no flow resisting element, such as an orifice, throttling valve, or a is disposed between the fluid reservoir 21 and the drain port 18c, no damping force against the upward motion of the piston 15c in the hydraulic cylinder 15A will be produced in response to the bounding motion of the suspension member. Since the damping force exerted on the piston 15c may serve to allow transmission of the part of bounding energy to the vehicle body to cause a rough ride feeling, the shown embodiment of the suspension system may provide a satisfactorily high level riding comfort by completely absorbing the bounding and rebounding energy set forth above.

Figure 5:
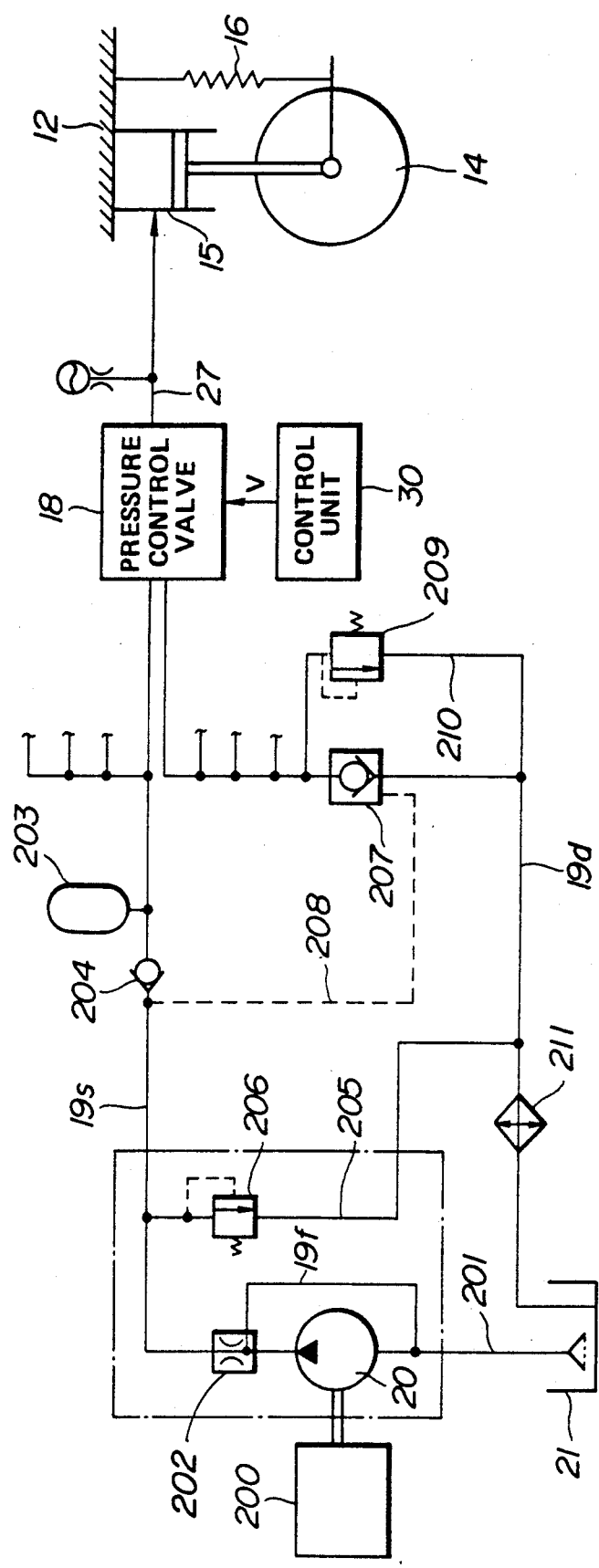
FIG. 5 is a schematical and diagramatical illustration of a hydraulic circuit to be employed for the preferred embodiment of the line pressure control of the invention.

FIG. 5 shows detailed circuit construction of the preferred embodiment of the pressure source unit to be employed in the suspension control system according to the invention. As set forth, the pressure source unit includes the pressure unit 20 which comprises a fluid pump, and is connected to the reservoir 21 via a suction pipe 201 which is driven by means of an automotive engine 200. The outlet of the pressure unit 20, through which the pressurized working fluid is fed, is connected to the inlet port 18b of the pressure control valve 18 via the supply line 19s. A pressure regulating orifice 202 is disposed in the supply line 19s for suppressing pulsed flow of the working fluid and whereby regulate the output pressure of the pressure unit 20 to be delivered to the pressure control valve 18. A feedback line 19f is connected to the upstream end of the pressure regulating orifice 202. The other end of the feedback line 19f is connected upstream of the inlet of the pressure unit 20. Therefore, excessive fluid between the pressure unit 20 and the orifice 202 is fed back to the inlet side of the pressure unit.

A pressure accumulator 203 is also connected to the supply line 19s to receive therefrom the pressurized fluid for accumulating the pressure. A one-way check valve 204 is disposed in the supply line 19s position upstream of the junction between the pressure accumulator 203 and the supply line 19s.

A pressure relief line 205 is also connected to the supply line 19s at the position intermediate between the pressure regulating orifice 202 and the one-way check valve 204, at one end. The other end of the pressure relief line 205 is connected to the drain line 19d. A pressure relief valve 206 is disposed in the pressure relief line 205. The pressure relief valve 206 is responsive to the fluid pressure in the supply line 19s higher than a given value to drain part of the working fluid to the drain line for maintaining the pressure in the supply line 19s below the given pressure value.

On the other hand, a shut-off valve 207 is disposed in the drain line 19d. The shut-off valve 207 is also connected to the supply line 19s at upstream of the one-way check valve 204 to receive therefrom the pressure in the supply line as a pilot pressure, via pilot line 208. The shut-off valve 207 is designed to be maintained at an open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 19d may flow therethrough to the reservoir tank 21. On the other hand, the shut-off valve 207 is responsive to the pilot pressure drops below the given pressure level to be switched into a shut-off position. At the shut-off position, the shut-off valve blocks fluid communication between the drain port 18c and the reservoir tank 21.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 19d upstream thereof, higher than a set pressure, e.g. 30 kgf/cm$^2$, in order to establish fluid communication between the upstream side and downstream side of the shut-off valve to allow the excessive pressure at the upstream side drain line 19d to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 19d for cooling the working fluid returning to the reservoir tank 21.

A pressurized fluid supply operation to be performed by the pressure source unit as set forth above will be discussed herebelow.

While the automotive engine 200 is running, the fluid pump as the pressure unit 20 is driven. Therefore, the working fluid in the reservoir tank 21 is sucked via the suction pipe 201 and pressurized through the pressure unit 20. The pressurized working fluid is discharged from the outlet of the pressure unit 20 and fed to the pressure control valve 18 via the supply line 19s including the pressure regulating orifice 202 and the one-way check valve 204. When the pressure control valve 18 in the position illustrated in FIG. 3(A), the pressurized working fluid passes the pressure control valve and is introduced into the upper fluid chamber 15d of the hydraulic cylinder 15. On the other hand, when the pressure control valve 18 is in the position of FIG. 3(B) to block communication between the supply line 19s and the upper fluid chamber 15d, the line pressure in the supply line increases. When the line pressure in the supply line 19s becomes higher than a set pressure of the pressure relief valve 206 in the pressure relief line 205, the excessive pressure higher than the set pressure is fed to the drain line 19d via the pressure relief valve 206 and thus returned to the reservoir tank 21.

The fluid pressure in the supply line 19s is also fed to the shut-off valve 207 via the pilot line 208. As set forth, the shut-off valve 207 is placed at an open position as long as the pilot pressure introduced through the pilot line 208 is held higher than or equal to the set pressure thereof. Therefore, fluid communication between the pressure control valve 18 and the reservoir tank 21 is maintained. When the pressure control valve 18 is in the position of FIG. 3(B), the working fluid is thus returned to the reservoir tank 21 via the drain line 19d via the shut-off valve 207 and the oil cooler 211.

Since the shut-off valve 207, even at the open position, serves as a resistance to the fluid flow the fluid pressure in the drain line 19d upstream of the shut-off valve 207 becomes excessively higher, i.e. higher than the off-set pressure $P_O$. Then, the pressure relief valve 209 becomes active to open for allowing the excessive pressure of the working fluid to flow through the by-pass line 210.

When the engine 200 stops, the pressure unit 20 ceases operation. By the stopping of the pressure unit 20, the working fluid pressure in the supply line 19s drops. According to the drop of the pressure in the supply line 19s, the pilot pressure to be exerted to the shut-off valve 207 via the pilot line 208 drops. When the pilot pressure in line 208 drops below or equal to the set pressure, the shut-off valve 207 is switched into its shut-off position to block fluid communication therethrough. As a result, the fluid pressure in the drain line 19d upstream of the shut-off valve 207 becomes equal to the pressure in the upper fluid chamber 15d. Therefore, even when the working fluid leaks through a gap between the spool valve 19 and the inner periphery of the valve bore 18a, it will not affect the fluid pressure in the upper fluid chamber 15d.

This is advantageous to maintain the suspension characteristics of the suspension systems irrespective of the engine driving condition.

Figure 6:
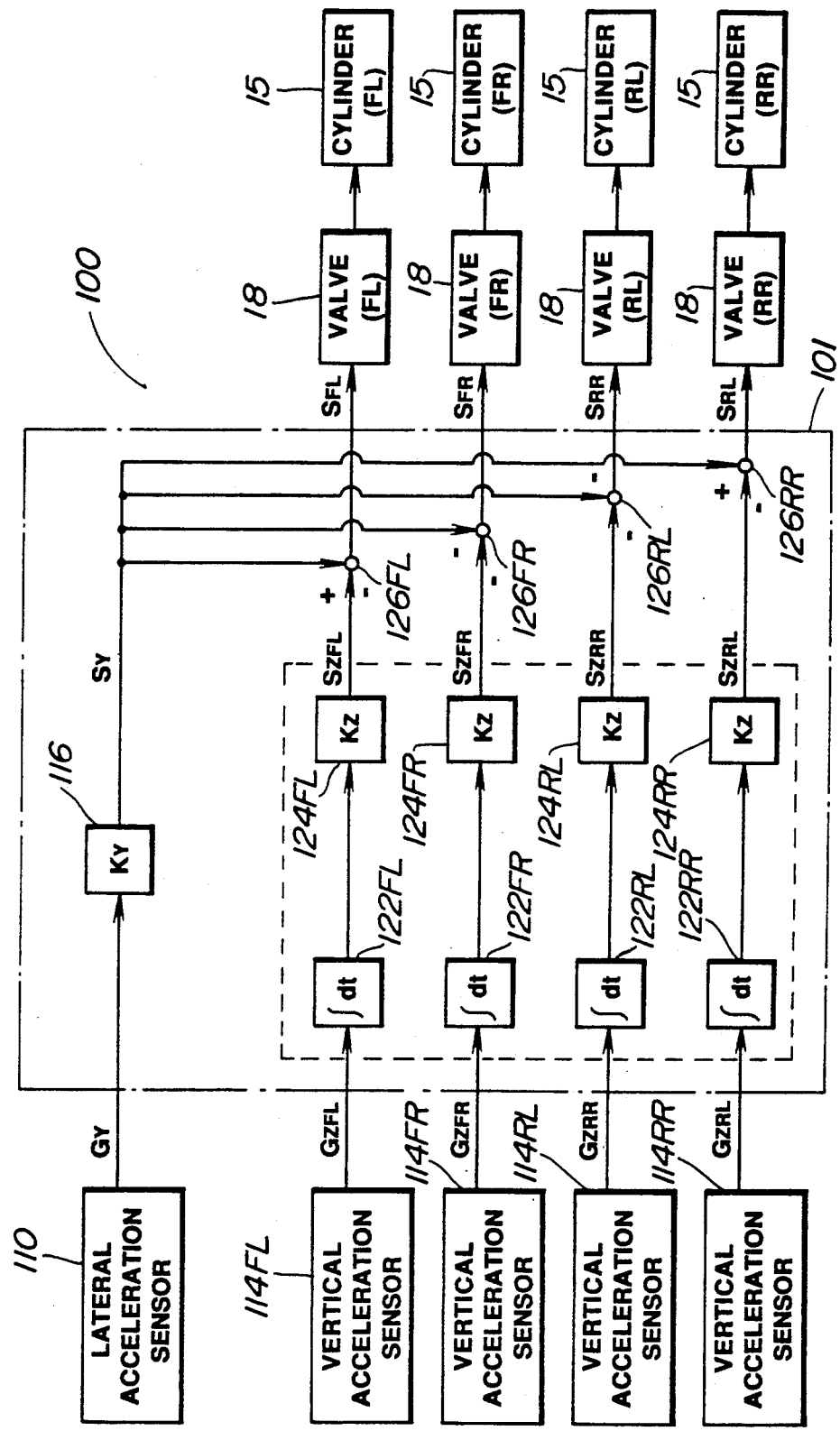
FIG. 6 is a schematic block diagram of the preferred embodiment of suspension control system of FIG. 1.

In order to perform control for adjusting suspension characteristics depending upon the vehicle driving condition, the microprocessor-based control unit 100 is provided. The suspension control system including the control unit 100 is illustrated in FIG. 6. The control unit 100 includes a microprocessor 101 which comprises an arithmetic circuit 102, a memory and input/output unit A lateral acceleration sensor 110 is also provided for monitoring lateral acceleration to be exerted on the vehicle to produce a lateral acceleration indicative signal Gy. Vertical acceleration sensors 114FL, 114FR, 114RL and 114RR are provided for monitoring vertical accelerations at respective front-left, front-right, rear-left and rear-right suspension systems 11FL, 11FR, 11RL and 11RR to produce vertical acceleration indicative signals. Hereafter, the acceleration sensor 114FL monitoring vertical acceleration at the front-left suspension system 11FL will be referred to as "FL vertical acceleration sensor". Similarly, the acceleration sensor 114FR monitoring vertical acceleration at the front-right suspension system 11FR will be referred to as "FR vertical acceleration sensor"; the acceleration sensor 114RL monitoring vertical acceleration at the rear-left suspension system 11RL will be referred to as "RL vertical acceleration sensor"; and the acceleration sensor 114RR monitoring vertical acceleration at the rear-right suspension system 11RR will be referred to as "RR vertical acceleration sensor". The vertical acceleration indicative signals produced by respective FL, FR, RL and RR vertical acceleration sensors 114FL, 114FR, 114RL and 114RR will be hereafter referred to respectively as "FL vertical acceleration indicative signal $Gz_{FL}$", "FR vertical acceleration indicative signal $Gz_{FR}$", "RL vertical acceleration indicative signal $Gz_{RL}$" and "RR vertical acceleration indicative signal $Gz_{RR}$".

The vertical acceleration sensors 114FL, 114FR, 114RL and 114RR may, in practice, comprise a strain gauge or piezoelectric sensor mounted at the top end portion of the suspension struts at respective front-left, front-right, rear-left and rear-right wheels. The practical construction of the vertical acceleration sensor has been disclosed in the co-pending U.S. patent application Ser. No. 120,964, filed on Nov. 16, 1987. The disclosure of the above-identified U.S. patent application Ser. No. 120,964 is herein incorporated by reference for the sake of disclosure.

Respective vertical acceleration sensors 114FL, 114FR, 114RL and 114RR are connected to integration circuits 122FL, 122FR, 122RL and 122RR. Respective integration circuits 122FL, 122FR, 122RL and 122RR are designed for integrating respective FL, FR, RL and RR vertical acceleration indicative signals $Gz_{FL}$, $Gz_{FR}$, $Gz_{RL}$ and $Gz_{RR}$ for deriving values representative of magnitude of vertical displacement at respective front-left, front-right, rear-left and rear-right portions of the vehicular body. The integration circuits 122FL, 122FR, 122RL and 122RR generate signals having values representative of the derived vertical displacement magnitude at respective front-left, front-right, rear-left and rear-right portions of the vehicular body. The signals output by the integration circuit 122FL, 122FR, 122RL and 122RR will be hereafter referred to respectively as "FL displacement indicative signal $\int dt_{FL}$", "FR displacement indicative signal $\int dt_{FR}$", "RL displacement indicative signal $\int dt_{RL}$" and "RR displacement indicative signal $\int dt_{RR}$". These displacement indicative signals $\int dt_{FL}$, $\int dt_{FR}$, $\int dt_{RL}$ and $\int dt_{RR}$ are fed to amplifiers 124FL, 124FR, 124RL and 124RR. The amplifiers 124FL, 124FR, 124RL and 124RR are respectively provided amplifier gain Kz for amplifying the received displacement indicative signals $\int dt_{FL}$, $\int dt_{FR}$, $\int dt_{RL}$ and $\int dt_{RR}$ with the provided amplifier gain for generating vertical displacement dependent control signal values $Sz_{FL}$, $Sz_{FR}$, and $Sz_{RR}$ respectively having values corresponding to the integrated values amplified with the amplifier gain Kz.

Respective of the amplifier 124FL, 124FR, 124RL and 124RR are connected to inverting input terminals of adder circuits 126FL, 126FR, 126RL and 126RR. To the adder circuits 126FL, 126FR, 126RL and 126RR, the lateral acceleration sensor 110 is connected via an amplifier 116 having an amplifier gain Ky. The amplifier 116 outputs the lateral acceleration dependent suspension control signal Sy variable depending upon the magnitude of the lateral acceleration Gy exerted on the vehicular body. The adder circuits 126FL and 126RL have non-inverting input terminal to receive the lateral acceleration dependent suspension control signal Sy and the adder circuits 126FR and 126RR have inverting input terminal for receiving the lateral acceleration dependent suspension control signal Sy. Respective of adder circuits 126FL, 126FR, 126RL and 126RR thus derive suspension control commands $S_{FL}$, $S_{FR}$, $S_{RL}$ and $S_{RR}$ for controlling valve position of the pressure control valves 18 and whereby adjusting fluid pressure in respective of the hydraulic cylinders 15.

Figure 7:
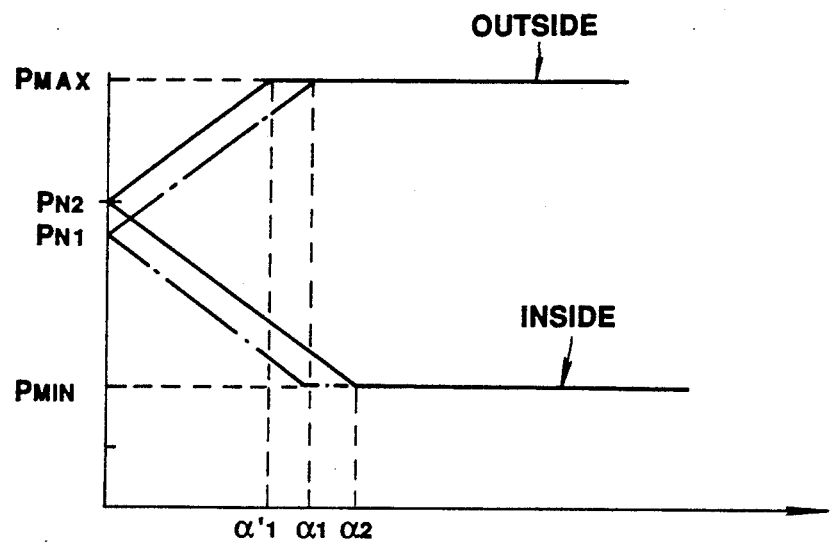
FIG. 7 is chart showing variations of fluid pressure as controlled by a pressure control valve in the preferred embodiment of the control system.

Here, respective suspension control commands $S_{FL}$, $S_{FR}$, $S_{RL}$ and $S_{RR}$ are set for providing variation characteristics of the output fluid pressure of respective pressure control valves 18 as illustrated in FIG. 7. As can be seen from FIG. 7, the control pressure P output from the control port of the pressure control valve 18 varies between a predetermined maximum pressure $P_{MAX}$ and a predetermined minimum pressure $P_{MIN}$ across a neutral pressure PN. In the normal state cornering, at which the lateral acceleration $\alpha$ to be exerted on the vehicular body is smaller than or equal to a lateral acceleration criterion $\alpha_1$, the neutral pressure $PN_1$ is set at $\{(P_{MAX}+P_{MIN})/2\}$ so that the neutral pressure $PN_1$ is set at center of the maximum and minimum pressure $P_{MAX}$ and $P_{MIN}$, as shown by phantom line in FIG. 7. At this state, increasing rate of the fluid pressure in the working chamber of the outside suspension system and the decreasing rate of the fluid pressure in the working chamber of the inside suspension system are equal to each other. With such characteristics, the vehicular rolling magnitude is at zero until the lateral acceleration $\alpha$ is increased across the lateral acceleration criterion $\alpha_1$. Furthermore, in such case that the lateral acceleration greater than the lateral acceleration criterion $\alpha_1$ is exerted on the vehicular body, the fluid pressure level in the outside and inside suspension systems are held maximum $P_{MAX}$ and minimum $P_{MIN}$. Therefore, vehicular body rolling is permitted without causing shifting of the gravity center. Therefore, despite of occurrence of vehicular rolling, vehicular driving stability and riding comfort can be maintained.

On the other hand, by shifting the neutral pressure PN to the pressure level $PN_2$ which is higher than $PN_1$ without changing the increasing rate and decreasing rate equal to each other, the maximum pressure $P_{MAX}$ is reached at a lateral acceleration $\alpha_1'$ which is smaller than $\alpha_1$. On the other hand, at these characteristics, the minimum pressure $P_{MIN}$ is reached at a lateral acceleration magnitude $\alpha_2$ which is greater than $\alpha_1$, as shown by a solid line in FIG. 7.

By providing such characteristics, the gravity center can be maintained at a position which is shifted downwardly even at the lateral acceleration greater than the lateral acceleration $\alpha_2$, at which the minimum fluid pressure $P_{MIN}$ is reached. Therefore, vehicular rolling at the lateral acceleration greater than $\alpha_2$ is caused with maintaining the lowered gravity center for providing satisfactorily high vehicular stability.

The characteristics with offsetting the neutral pressure PN as illustrated by the solid line in FIG. 7 can be achieved by providing longer stroke for the actuator rod 22b or, in the alternative, by providing greater spring coefficient for the spring 21.

In the practical suspension control, the lateral acceleration sensor 110 and the vertical acceleration sensors 114FL, 114FR, 114RL and 114RR continuously monitors lateral acceleration and vertical accelerations exerted on the vehicular body to input the lateral acceleration indicative signal Gy and vertical acceleration indicative signals $Gz_{FL}$, $Gz_{FR}$, $Gz_{RL}$ and $Gz_{RR}$ to the control unit 100. The control unit 100 performs anti-rolling suspension control on the basis of these input signals. Also, in the shown embodiment, bouncing control for the active suspension systems can be performed under the absence of the lateral acceleration indicative signal Gy. Namely, while the lateral acceleration dependent suspension control signal Sy is held zero due to absence of the lateral acceleration indicative signal Gy, the vertical acceleration dependent suspension control signals $Sz_{FL}$, $Sz_{FR}$, $Sz_{RL}$ and $Sz_{RR}$ are output from the adder circuits 126FL, 126FR, 126RL and 126RR as suspension control commands $S_{FL}$, $S_{FR}$, $S_{RL}$ and $S_{RR}$. Therefore, fluid pressure for damping vertical displacement energy is generated in respective hydraulic cylinders 15 for achieving anti-bouncing opertion.

Therefore, while the vehicle travels in a straight line to maintain the lateral acceleration at zero, bouncing control for damping vertical displacement of the vehicular body due to undulation on the road surface or so forth, which may create relatively low frequency and large magnitude of vehicular body vibration, can be successfully suppressed. As set forth, since the pressure control valves 18 as well as the hydraulic circuit in the shown embodiment of the active suspension system are per se capable of absorbing relatively high frequency and small magnitude of road shook vibration, substantially high level riding comfort can be achieved by the shown construction of the active suspension system.

On the other hand, during cornering, lateral acceleration is generated by centrifugal force. This lateral acceleration serves as a cause of vehicular rolling. The lateral acceleration sensor 110 then starts to output the lateral acceleration indicative signal Gy having a signal level corresponding to magnitude of lateral acceleration exerted on the vehicular body. Therefore, the lateral acceleration dependent suspension control signal Sy is generated by the amplifier 116 and input to the adder circuits 126FL, 126FR, 126RL and 126RR. Therefore, the suspension control commands $S_{FL}$, $S_{FR}$, $S_{RL}$ and $S_{RR}$, each incorporating the vertical acceleration dependent component and the lateral acceleration dependent component, are applied to the pressure control valve 18.

Here, when the vehicular cornering is performed in a normal or steady state without causing substantial attitude change, the vertical accelerations exerted on the the front-left, front-right, rear-left and rear-right portions of the vehicle body are maintained substantially zero. Therefore, the vertical acceleration dependent suspension control signals $Sz_{FL}$, $Sz_{FR}$, $Sz_{RL}$ and $Sz_{RR}$ produced by the amplifiers 124FL, 124FR, 124RL and 124RR are maintained substantially zero. Therefore, at this time, the suspension control commands $S_{FL}$, $S_{FR}$, $S_{RL}$ and $S_{RR}$ are determined principally depending upon the lateral acceleration dependent suspension control signal Sy. Since the lateral acceleration dependent suspension control signal Sy is input as a different polarity signal in the adder circuits 126FL, 126RL and 126RL, 126RR, the polarity of the front-left and rear-left suspension control commands $S_{FL}$ and $S_{RL}$ and the front-right and rear-right suspension control commands $S_{FR}$ and $S_{RR}$ becomes opposite for hardening outside suspension systems and softening inside suspension systems.

If the characteristics illustrated by phantom line in FIG. 7 are effected by setting the neutral pressure at $PN_1$, the vehicular rolling can be completely suppressed until the lateral acceleration $\alpha$ becomes greater than $\alpha_1$. Even when the lateral acceleration becomes greater than $\alpha_1$, the gravity center is held at lowered position to maintain satisfactorily high driving stability and riding comfort. On the other hand, when the characteristics as illustrated by solid line in FIG. 7 are effected by setting the neutral pressure PN at $PN_2$, the fluid pressure in the working chamber in the outside suspension system reaches the maximum pressure at the lateral acceleration $\alpha_1'$ and subsequently maintained at the maximum. On the other hand, even after the lateral acceleration exceeds $\alpha_1'$, the fluid pressure in the working chamber of the inside suspension system is maintained to be decreased toward the minimum pressure $P_{MIN}$ until the lateral acceleration reaches $\alpha_2$. When the lateral acceleration exceeds $\alpha_1'$, vehicle the body starts rolling with maintaining the fluid pressure at maximum pressure. At this time, fluid pressure in the working chamber of the inside suspension system decreases until the lateral acceleration exceeds $\alpha_2$. Therefore, vehicle body attitude changes in reverse rolling direction.

Figure 8:
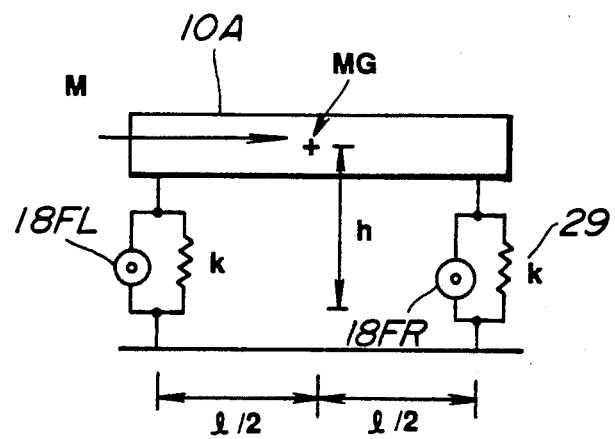
FIG. 8 is an illustration of a model provided for demonstrating suspension characteristics as controlled by the preferred embodiment of the control system of the invention.
Figure 9:
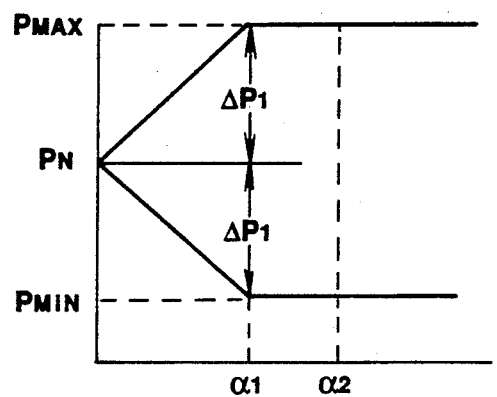
FIG. 9 is a chart showing pressure variation characteristics equivalent to that illustrated by phantom linis in FIG. 7.

Here, the idea of the present invention will be discussed herebelow with reference to a model illustrated in FIG. 8. FIG. 8 shows a control model for anti-rolling suspension control with lateral acceleration data in right-hand cornering in steady state. In the shown model, it is assumed that the vehicular body 10A is a sprung mass which is supported by means front-left of and front-right steering systems 29FL and 29FR having the working chambers of the hydraulic cylinders 15 and mechanical springs 16 having spring coefficient k. At the shown state, the gravity center MG of the vehicle is distanced from a roll center at a distance h. The tread between the front-left and front-right wheels is l. It is further assumed that the lateral acceleration is $\alpha$, and the mass weight of the vehicle body is m. Furthermore, the sectional area of the piston 15c the hydraulic cylinder 15 is A. If the characteristics of variation of the pressure in the working chamber is as illustrated in FIG. 9, which characteristics corresponding to that illustrated by phantom line in FIG. 7, the rolling moment M to be exerted on the vehicle body can be illustrated by:

$$M = m \times \alpha_1 \times h$$

If the spring in the outside suspension system is compressed in a magnitude $\Delta x_1$ and the spring in the outside suspension system is expanded in a magnitude $\Delta x_2$, the load at wheels in the outside and inside suspension systems can be illustrated by:

Outside wheel $W_1 = W_0 + \Delta P_1 A + \Delta x_1 k$

Inside wheel $W_2 = W_0 + \Delta P_1 A - \Delta x_2 k$ here, $W_0$ is wheel load when the lateral acceleration is zero and can be illustrated by:

$$W_0 = P_0 \times A + k \times x_0$$

In the foregoing, moment balance can be illustrated by:

$$\begin{aligned} M &= \{l \times (W_1 - W_2)\}/2 \\ &= (l/2) \times (2\Delta P_1 A + k(\Delta x_1 + \Delta x_2)) \end{aligned} \quad (1)$$

Therefore, balance of wheel load variation can be derived by:

$$\Delta P_1 A + \Delta x_2 k = P_1 A + \Delta x_2 k \quad (2)$$

From the equation (1) and (2), the condition for maintaining the vehicular body at zero rolling condition without causing height variation can be illustrated by:

$$\Delta x_1 = \Delta x_2 = 0$$

From this, the foregoing equation (1) and (2) are modified as:

$$M = l\Delta P_1 A \quad (3)$$

$$\Delta P_1 = M/Al = (mh/Al) \times \alpha_1 \quad (4)$$

If the lateral acceleration $\alpha$ becomes greater than $\alpha_1$ and reaches $\alpha_2$, and pressure variations at the outside suspension system and the inside suspension system are zero, the increased rolling moment $\Delta M$ can be derived by:

$$M + \Delta M = (l/2) \times (2\Delta P_1 A + k(\Delta x_1 + \Delta x_2)) \quad (5)$$

$$k\Delta x_1 = k\Delta x_2 \quad (6)$$

Utilizing the foregoing equation (3), the equation (5) can be modified as:

$$\Delta M = (l/2) \times k(\Delta x_1 + \Delta x_2)$$

From the above, $$\Delta x_1 = \Delta x_2 = \Delta M/lk \quad (7)$$

Figure 10:
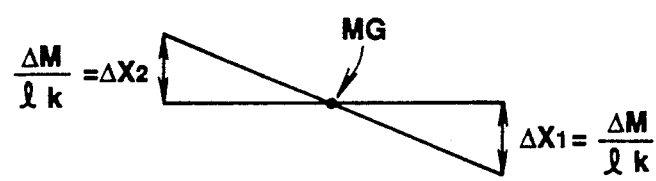
FIG. 10 is an illustration showing distribution of rolling moment exerted on the vehicular body when the pressure variation characteristics of FIG. 9 are used.

Therefore, as shown in FIG. 10, vehicular rolling without causing displacement of the gravity center can be achieved.

Figure 11:
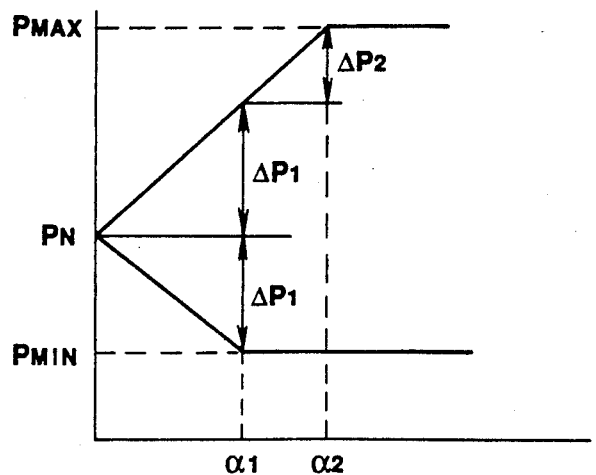
FIG. 11 is a chart showing pressure variation characteristics in the conventional suspension control system.

On the other hand, when the neutral pressure PN is shifted at a level smaller than $PN_1$ to provide the characteristics as shown in FIG. 11, load at wheels in the outside and inside suspension systems can be illustrated by:

Outside wheel $W_1 = W_0 + \Delta P_1 A + \Delta P_2 A + \Delta x_1 k$
Inside wheel $W_2 = W_0 - \Delta P_1 A - \Delta x_2 k$ Balance of the increased rolling moment can be derived by:

$$M + \Delta M = (l/2) \times (W_1 - W_2)$$
$$= (l/2) \times (2\Delta P_1 A + \Delta P_2 A + k(\Delta x_1 + \Delta x_2))$$

On the other hand, balance of wheel load variation can be derived by:

$$\Delta P_1 A + \Delta P_2 A \Delta x_1 k = \Delta P_1 A + \Delta x_2 k$$

For this, the following equations can be derived:

$$\Delta M = (l/2) \times (\Delta P_2 A + k(\Delta x_1 + \Delta x_2))$$

$$k(\Delta x_2 - \Delta x_1) = \Delta P_2 A$$

Therefore, $$\Delta x_1 = (\Delta M/lk) - (\Delta P_2 A)/k$$

$$\Delta x_2 = \Delta M/lk$$

Figure 12:
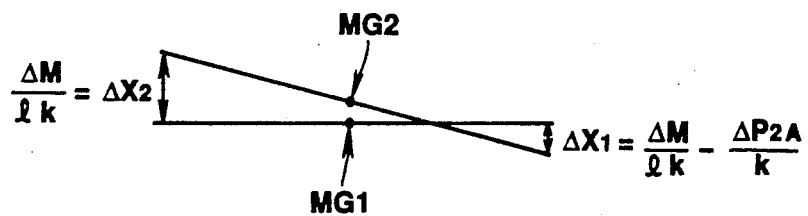
FIG. 12 is an illustration showing distribution of rolling moment exerted on the vehicular body when the pressure variation characteristics of FIG. 11 are used.

Therefore, as shown in FIG. 12, the gravity center is shifted from $MG_1$ to $MG_2$. As will be appreciated, such upward shifting of the gravity center degrades driving stability and degrades riding comfort.

Figure 13:
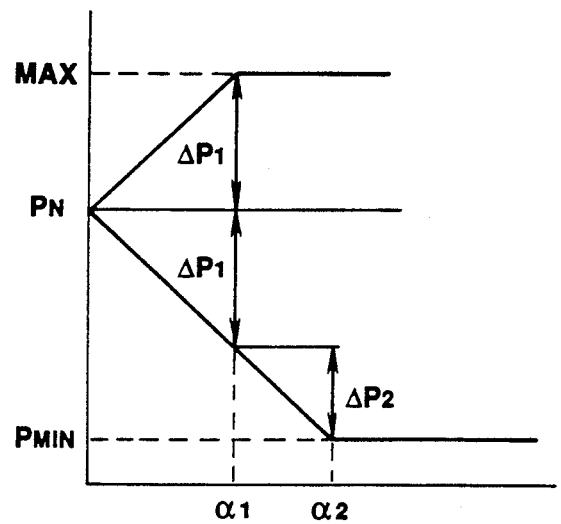
FIG. 13 is a chart showing pressure variation characteristics equivalent to that illustrated by solid linis in FIG. 7.

In contrast to this, when the neutral pressure PN is shifted at a level greater than $PN_1$ to provide the characteristics as shown in FIG. 13 which correspond to the characteristics as illustrated by the solid lines in FIG. 7, the load at the wheels in the outside and inside suspension systems can be illustrated by:

Outside wheel $W_1 = W_0 + \Delta P_1 A + \Delta x_1 k$

Inside wheel $W_2 = W_0 - \Delta P_1 A - \Delta P_2 A - \Delta x_2 k$

Balance of the increased rolling moment can be derived by:

$$M + \Delta M = (l/2) \times \{2\Delta P_1 A + \Delta P_2 A + k(\Delta x_1 + \Delta x_2)\}$$

On the other hand, balance of wheel load variation can be derived by:

$$\Delta P_1 A + \Delta x_1 k = \Delta P_1 A + \Delta P_2 A + x_2 k$$

For this, the following equations can be derived:

$$\Delta x_1 = \Delta M/lk$$

$$\Delta x_2 = \Delta M/lk - (\Delta P_2 A)/k$$

Figure 14:
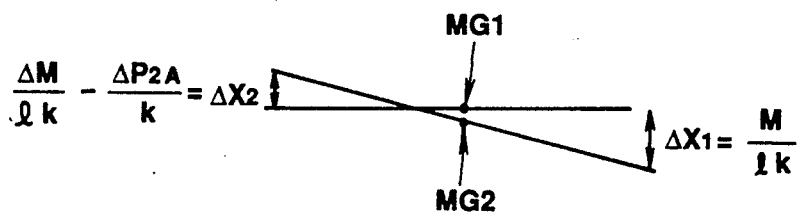
FIG. 14 is an illustration showing distribution of rolling moment exerted on the vehicular body when the pressure variation characteristics of FIG. 13 are used.

Therefore, as shown in FIG. 14, the gravity center is shifted from $MG_1$ to $MG_3$. As will be appreciated, such downward shifting of the gravity center will provide satisfactorily high driving stability and can maintain sufficient riding comfort.

As will be clear from the discussion given hereabove, the present invention successfully provides a sufficiently high level of driving stability and riding comfort by providing neutral pressure of the control pressure to be output from the pressure control valve at a level higher than or equal to the center pressure of the predetermined maximum and minimum pressures.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 15:
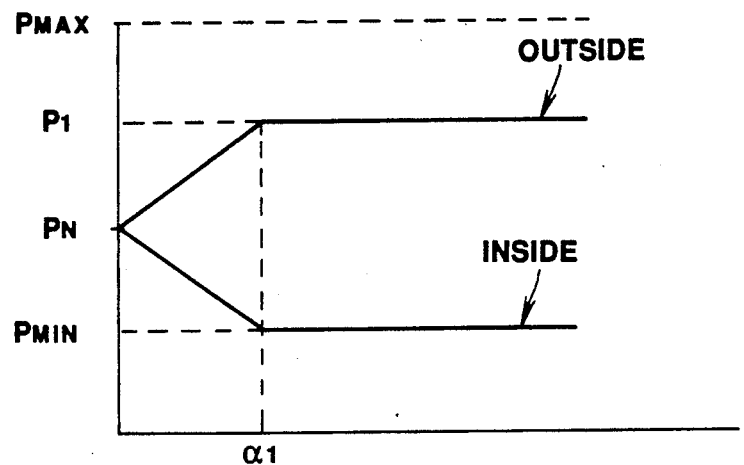
FIGS. 15 and 16 are charts respectively showing modified pressure variation characteristics for implementing the present invention.
Figure 16:
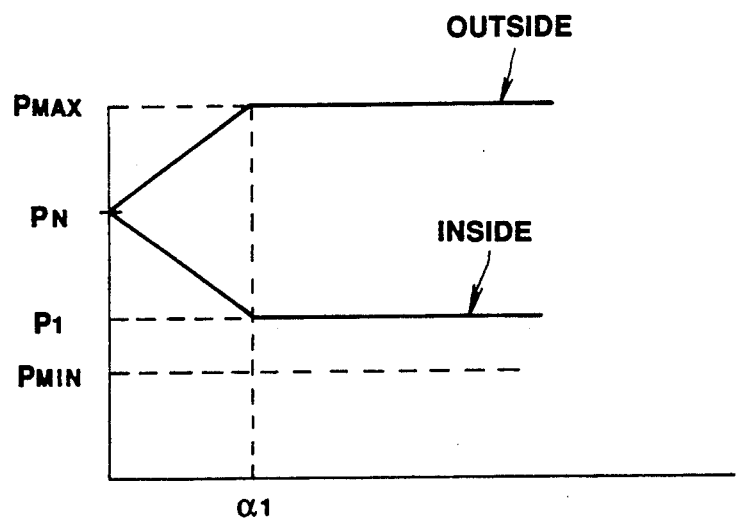

For example, though the shown embodiment discussed hereabove has been provided fixed setting of the pressure variation characteristics, it may be possible to set move than one set of characteristics for selectively using appropriate characteristics depending upon the vehicle driving condition. Particularly, in the case in which the control unit is formed by a microprocessor, setting of a plurality of variation characteristics and selecting one of these according to predetermined parameters can be easily done. Furthermore, it may also be possible to set the maximum pressure at a level $P_1$ at a level lower than the maximum pressure $P_{MAX}$ as shown in FIG. 15. In the alternative, it is further possible to set the minimum level at $P_1$ at a level higher than the minimum pressure $P_{MIN}$ as shown in FIG. 16.

What is claimed is:

1. An anti-rolling control system for an active suspension system for an automotive vehicle comprising:
a first suspension system disposed between one lateral side of a vehicular body and a suspension member rotatingly supporting a first rod wheel, said first suspension system including a first hydraulic means having hydraulic damping characteristics which are variable between a first set of characteristics at which the damping force to be generated is a maximum and a second set of characteristics at which the damping force to be generated is a minimum across a predetermined neutral set of characteristics;
a second suspension system disposed between another lateral side of said vehicular body and a suspension member rotatingly supporting a second rod wheel, said second suspension system including a second hydraulic means having hydraulic damping characteristics which are variable between said first set of characteristics and said second set of characteristics across said predetermined neutral set of characteristics;

a first pressure control means, connected to said first hydraulic means, for controlling fluid pressure in said first hydraulic means for varying said damping characteristics between said first and second sets of characteristics;

a second pressure control means, connected to said second hydraulic means, for controlling fluid pressure in said second hydraulic means for varying said damping characteristics between said first and second sets of characteristics;

a first sensor means for monitoring a lateral acceleration exerted on the vehicular body and for producing a lateral acceleration indicative signal indicative of the magnitude of the monitored lateral acceleration and the direction thereof; and a control means for deriving first and second lateral acceleration dependent control signals on the basis of said lateral acceleration indicative signal for varying the damping characteristics of one of said first and second suspension systems toward said first set of characteristics and for varying the damping characteristics of the other of said first and second suspension systems toward said second set of characteristics for suppressing vehicular rolling, said controlling means setting control characteristics so that said damping characteristics of said one of said first and second suspension systems reaches said first set of characteristics at a first predetermined magnitude of lateral acceleration and said damping characteristics of the other of said first and second suspension systems reaches said second set of characteristics at a second predetermined magnitude of lateral acceleration, which second predetermined magnitude is at least as large as said first predetermined magnitude.

2. An active suspension control system as set forth in claim 1, wherein each of said first and second suspension systems varies damping characteristics between said first and second sets of characteristics according to the magnitude and direction of said lateral acceleration at a constant rate.

3. An active suspension control system as set forth in claim 2, wherein said control means provides an offset of said neutral set of characteristics toward said first set of characteristics at a predetermined magnitude from a center set of characteristics between said first and second sets of characteristics.

4. An active suspension control system as set forth in claim 1, wherein said first and second pressure control means are responsive to said first and second lateral acceleration dependent control signals for varying damping characteristics at a same variation gradient.

5. An active suspension control system as set forth in claim 1, which further comprises a second sensor for monitoring vertical acceleration at said first suspension system for producing a first vertical acceleration indicative signal, and a third sensor for monitoring vertical acceleration at said second suspension system for producing a second vertical acceleration indicative signal, and wherein said control means is responsive to said first and second vertical acceleration indicative signals for producing first and second vertical acceleration dependent control signals for controlling said first and second pressure control means for performing bouncing control independently of each other.

6. An active suspension control system as set forth in claim 5, wherein said control means includes means for combining said first lateral acceleration dependent control signal and said first vertical acceleration dependent control signal for producing a first and second control command for controlling operation of said first and second pressure control means.

7. An active suspension control system as set forth in claim 1, wherein said first and second hydraulic means respectively include means for absorbing high frequency and small magnitude road shock.

8. An anti-rolling control system for an active suspension system for an automotive vehicle comprising:

a suspension system for supporting a vehicular body on a first wheel at a first lateral side and on a second wheel at a second lateral side opposite to said first lateral side, said suspension system including first and second cylinders filled with a working fluid having a pressure which is variable between a predetermined first maximum pressure and a predetermined second minimum pressure across a predetermined neutral pressure between said first and second fluid pressures;

a first pressure control means, associated with first cylinders, for adjusting said first fluid pressure in said first cylinder;

a second pressure control means, associated with second cylinder, for adjusting said second fluid pressure in said second cylinder;

a first sensor means for monitoring a lateral acceleration exerted on the vehicular body and for producing a lateral acceleration indicative signal indicative of a magnitude of the monitored lateral acceleration and a direction thereof; and a control means for deriving first and second lateral acceleration dependent control signals on the basis of said lateral acceleration indicative signal, for varying the fluid pressure of one of said first and second cylinders toward said first fluid pressure, and for varying the fluid pressure of the other of said first and second cylinders toward said second fluid pressure for suppressing vehicular rolling, said controlling means setting control characteristics so that said fluid pressure of said one of said first and second cylinders reaches said first fluid pressure at a first predetermined magnitude of lateral acceleration and said fluid pressure of said the other of said first and second cylinders reaches said second fluid pressure at a second predetermined magnitude of lateral acceleration, which second predetermined magnitude is at least as large as said first predetermined magnitude.

9. An active suspension control system as set forth in claim 8, wherein each of said first and second cylinders varies fluid pressure between said first and second fluid pressures according to the magnitude and the direction of said lateral acceleration at a constant rate.

10. An active suspension control system as set forth in claim 9, wherein said control means provides an offset of said neutral pressure toward said first fluid pressure at a predetermined magnitude from a center pressure between said first and second fluid pressures.

11. An active suspension control system as set forth in claim 8, wherein said first and second pressure control means are responsive to said first and second lateral acceleration dependent control signals for varying fluid pressures at a same variation gradient.

12. An active suspension control system as set forth in claim 8, wherein said first and second cylinders comprise portions of respective first and second suspension systems, and further comprising a second sensor for monitoring a vertical acceleration at said first suspension system for producing a first vertical acceleration indicative signal, and a third sensor for monitoring vertical acceleration at said second suspension system for producing a second vertical acceleration indicative signal, and wherein said control means is responsive to said first and second vertical acceleration indicative signals for producing first and second vertical acceleration dependent control signals for controlling said first and second pressure control means for performing bouncing control independently of each other.

13. An active suspension control system as set forth in claim 12, wherein said control means includes means for combining said first lateral acceleration dependent control signal and said first vertical acceleration dependent control signal for producing a first and second control command for controlling operation of said first and second pressure control means.

14. An active suspension control system as set forth in claim 8, wherein said first and second hydraulic means respectively include means for absorbing high frequency and small magnitude road shock.

* * * * *